(12) United States Patent
Cellier

(10) Patent No.: US 6,327,523 B2
(45) Date of Patent: *Dec. 4, 2001

(54) OVERHEAD SYSTEM OF INCLINED ECCENTRIC GEOSYNCHRONOUS ORBITTING SATELLITES

(75) Inventor: Alfred Cellier, Rancho Palos Verdes, CA (US)

(73) Assignee: Hughes Electronics Corporation, El Segundo, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/235,112

(22) Filed: Jan. 21, 1999

(51) Int. Cl.$^7$ .............................. G06F 7/00; G05D 1/00; G06G 7/78

(52) U.S. Cl. .................... 701/13; 701/226; 244/158 R; 455/12.1; 455/13.1; 455/13.2

(58) Field of Search .......................... 701/13, 3, 4, 226; 244/158 R, 164, 168, 169, 170, 171; 455/12.1, 13.1, 13.2, 430, 427, 438, 13.3; 342/359, 354, 352, 356, 355

(56) References Cited

U.S. PATENT DOCUMENTS

| | | |
|---|---|---|
| 3,497,807 | 2/1970 | Newton . |
| 4,691,882 | 9/1987 | Young ............................ 244/158 R |
| 4,809,935 | 3/1989 | Draim ............................ 244/158 R |
| 5,119,225 | 6/1992 | Grant et al. .................... 359/172 |
| 5,120,007 | 6/1992 | Pocha et al. .................... 244/158 R |
| 5,326,054 * | 7/1994 | Turner ............................ 244/158 R |
| 5,551,624 | 9/1996 | Horstein et al. ............... 244/158 R |
| 5,553,816 * | 9/1996 | Perrotta ......................... 244/158 R |
| 5,561,837 * | 10/1996 | Muller et al. .................. 455/13.1 |
| 5,619,211 | 4/1997 | Horkin et al. .................. 342/357 |
| 5,641,134 | 6/1997 | Vatt ................................ 244/158 R |
| 5,669,585 | 9/1997 | Castiel et al. ................... 244/158 R |
| 5,678,175 | 10/1997 | Stuart et al. .................... 455/13.1 |
| 5,738,309 * | 4/1998 | Fowell ............................ 244/171 |
| 5,788,187 * | 8/1998 | Castiel et al. ................... 244/158 R |
| 5,810,297 | 9/1998 | Basuthakur et al. ............ 244/176 |
| 5,845,206 * | 12/1998 | Castiel et al. ................... 455/13.4 |
| 5,867,783 * | 2/1999 | Horstein et al. ................ 455/427 |
| 5,871,181 | 2/1999 | Mass .............................. 244/158 R |
| 5,918,157 | 6/1999 | Wiedeman ..................... 455/13.1 |
| 5,930,680 | 7/1999 | Lusignan ........................ 455/12.1 |
| 5,931,417 * | 8/1999 | Castiel ............................ 244/158 R |
| 5,940,739 | 8/1999 | Conrad et al. .................. 455/13.1 |
| 5,957,409 * | 9/1999 | Castiel et al. ................... 244/158 R |
| 5,961,077 * | 10/1999 | Koppel et al. .................. 244/158 R |
| 5,971,324 * | 10/1999 | Williams et al. ................ 244/158 R |
| 5,979,830 | 11/1999 | Kellermeier .................... 244/158 R |
| 5,979,832 * | 11/1999 | Draim ............................ 244/158 R |
| 5,991,279 | 11/1999 | Haugli et al. ................... 370/311 |

(List continued on next page.)

OTHER PUBLICATIONS

Chiba, I., et al. "Inclined Geo Satellite Communication System With Deployable Phased–Array Antennas" AIAA (1997) pp. 243–249.

(List continued on next page.)

*Primary Examiner*—Jacques H. Louis-Jacques
(74) *Attorney, Agent, or Firm*—Vijayalakshmi D. Duraiswamy; Michael W. Sales

(57) ABSTRACT

A system of inclined geosynchronous satellite orbits has a service area defined on a surface of the earth. The service area has elevation angles greater than a predetermined minimum elevation angle elevation angle from the horizon. A satellite has an orbit with respect to the earth having a sky track when viewed from within said service area. An operating arc is defined by a subset of points on the sky track within the service area. The satellites operate consecutively on the operating arc.

10 Claims, 7 Drawing Sheets

U.S. PATENT DOCUMENTS 6,019,318 * 2/2000 Cellier et al. .................. 244/158 R
6,059,233 * 5/2000 Koppel et al. .................. 244/158 R
6,116,545 * 9/2000 Salvatore et al. ............... 244/158 R
6,126,116   10/2000 Cellier ......................... 244/158 R
6,135,389 * 10/2000 Fowell .......................... 244/158 R
6,149,103 * 11/2000 Salvatore et al. ............... 244/158 R

OTHER PUBLICATIONS

"Effects of NGSO Provisional EPFD, APFD Limits on 'Quasi–Geostationary' Systems" ITU (Jun. 25, 1998).

* cited by examiner

OVERHEAD SYSTEM OF INCLINED ECCENTRIC GEOSYNCHRONOUS ORBITTING SATELLITES

TECHNICAL FIELD

The present invention relates generally to an overhead system of inclined eccentric geosynchronous orbit satellite orbits and, more particularly, to a satellite system whose operation is concentrated overhead as viewed from within a service area.

BACKGROUND OF THE INVENTION

Satellites in geostationary orbits (GSOs) have been widely preferred for several decades because of the economic advantages afforded by such orbits. In a geostationary orbit, a satellite traveling above the Earth's equator, in the same direction as that in which the Earth is rotating, and at the same angular velocity, appears stationary relative to a point on the Earth. These satellites are always "in view" at all locations within their service areas, so their utilization efficiency is effectively 100 percent. Antennas at Earth ground stations need be aimed at a GSO satellite only once; no tracking system is required.

Coordination between GSO's and with terrestrial services is facilitated by governmental allocation of designated "slots" angularly spaced according to service type. Given the desirability of geostationary satellite orbits and the fact that there are only a finite number of available "slots" in the geostationary "belt," the latter capacity has been essentially saturated with satellites operating in desirable frequency bands up through the Ku-band (up to 18 GHz). As a result, the government has been auctioning the increasingly scarce remaining slots.

This has encouraged the development of complex and expensive new systems including those using low Earth orbits (LEO's), medium Earth orbits (MEO's), and/or higher frequencies, for example, the Ka band (up to approximately 40 GHz). Growth to higher frequencies is limited by problems of technology and propagation, and expansion in satellite applications requires exploitation of the spatial dimension (i.e., above and below the GSO belt). A host of proposed LEO and MEO systems exemplify this direction. A drawback of LEO and MEO systems for users is the relative uncertainty of satellite position, and rapid motion, leading typically to the use of omnidirectional antennas having low gain, which limits data rate.

Highly elliptical orbits (HEO) such as the 12-hour "Molniya" long used by Russia, and the European Space Agency's 8-hour "Archimedes" have been used. HEO's disadvantages include a shorter fraction of service to a given area (fractionally geosynchronous period causes multiple nodes over the earth) and require specific 63° inclination (to minimize fuel requirements due to low perigee). LEO, MEO, and HEO systems require more satellites for coverage at a specified elevation angle to a single service area than does the present invention.

Another apparent drawback to the use of all inclined orbits is that of relative movement with respect to the ground. For wide bandwidths, two-dimensional tracking ground station antennas would be required. Tracking antennas are relatively expensive and thus are not considered for consumer applications.

There has been no known prior effort to exploit overhead systems of inclined eccentric geosynchronous orbits (IEGOs) in a systematic manner, even though the unused domain of inclined eccentric geosynchronous orbits offers great potential for the coordinatable growth of satellite service.

While the various prior systems function relatively satisfactorily and efficiently, none discloses the advantages of the overhead system of inclined, eccentric geosynchronous satellite orbits in accordance with the present invention as is hereinafter more fully described.

DISCLOSURE OF THE INVENTION

The present invention provides a satellite system that takes advantage of inclined eccentric geosynchronous orbits to provide relatively low cost satellite service particularly suitable for consumer markets.

The present invention also provides a satellite system with continuous coverage of the service area using a synchronized set of two or more satellites.

In one aspect of the invention, a synchronized system of inclined eccentric geosynchronous satellite orbits (IEGO) has a service area defined on a surface of the earth. The service area is defined with elevation angles greater than a predetermined minimum from the horizon, from anywhere within the service area to the satellite system. An IEGO satellite has an orbit with respect to the earth having an orbital sky track fixed in the sky when viewed from within said service area. Of course, the sky track has a ground track which corresponds thereto. An operating arc is defined by a subset of the orbital sky track over the service area. The satellites of the set operate successively on the operating arc portion of the sky track.

An advantage is that the overhead system can provide continuous high elevation coverage, with handover to another satellite phased in the same track. Another advantage of the present invention is that it allows the use of conical-pattern upward-looking user antenna rather than a tracking antenna.

The objects, advantages and features of the present invention are readily apparent from the following detailed description of the best mode for carrying out the invention when taken in connection with the accompanying drawings and appended claims.

BRIEF DESCRIPTION OF THE DRAWINGS

A more complete appreciation of the invention and many of the attendant advantages and features thereof may be readily obtained by reference to the following detailed description when considered with the accompanying drawings in which like reference characters indicate corresponding parts in all the views, wherein.

DESCRIPTION OF THE PREFERRED EMBODIMENT(S)

The present invention is illustrated herein in terms of a satellite orbit system using various inclination angles, eccentricity values and other values. It should be understood that specific numerical values are introduced as examples and not as final design values.

The essence of the invention is the establishment of inclined, preferably geosynchronous, satellite orbits with repeating ground tracks on the earth are whose sky tracks include operating arcs which are confined to a fixed one over the service area.

In the present invention, (24 hour), inclined elliptic geosynchronous orbits (IEGO) satellites enable operation to provide high elevation angle service for a predetermined service region on a landmass with possible spectrum re-use for small service areas.

Figure 1:
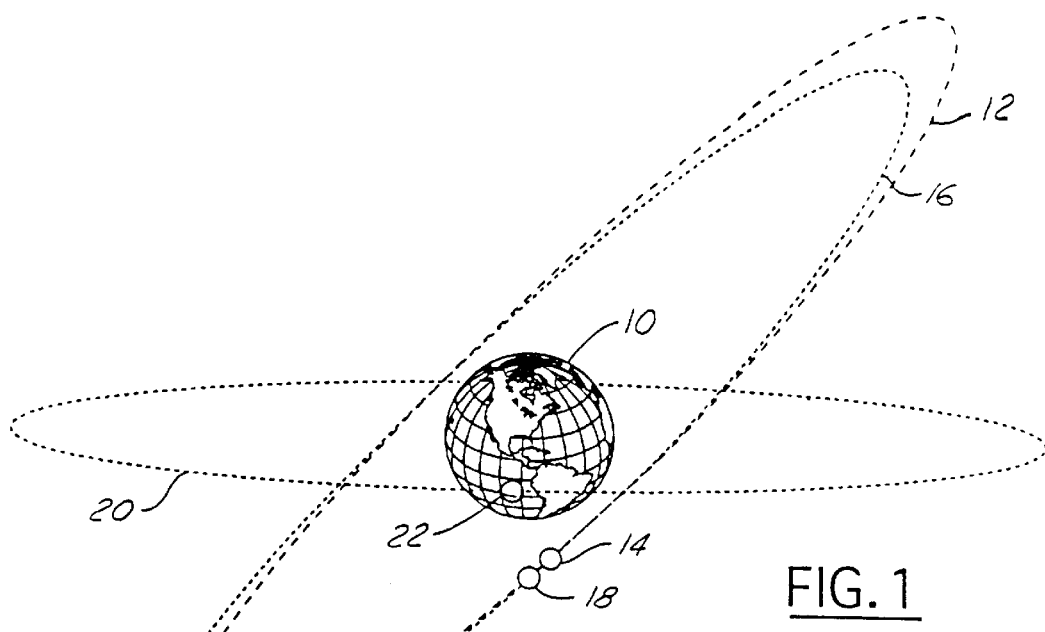
FIG. 1 is a perspective view of an inclined elliptic geosynchronous orbit, an inclined geosynchronous orbit, and a geostationary (IEGO) orbit with respect to the earth. The latter two orbits are for reference only.

Referring now to FIG. 1, Earth 10 is shown with an inclined eccentric geosynchronous orbit (IEGO) 12 that has an IEGO satellite 14. IEGO orbit 12 is shown in contrast to an inclined geosynchronous orbit (IGO) 16. IGO orbit 16 is an inclined circular orbit centered about the Earth 10. IGO orbit 16 has an IGO satellite 18 in a first position, which is used for reference. A geostationary (GSO) orbit 20 is also shown for contrast and has a GSO satellite 22. Each of the satellites 14, 18 and 22 follow their respective orbits 12, 16, 20 as they travel around Earth 10.

Figure 2:
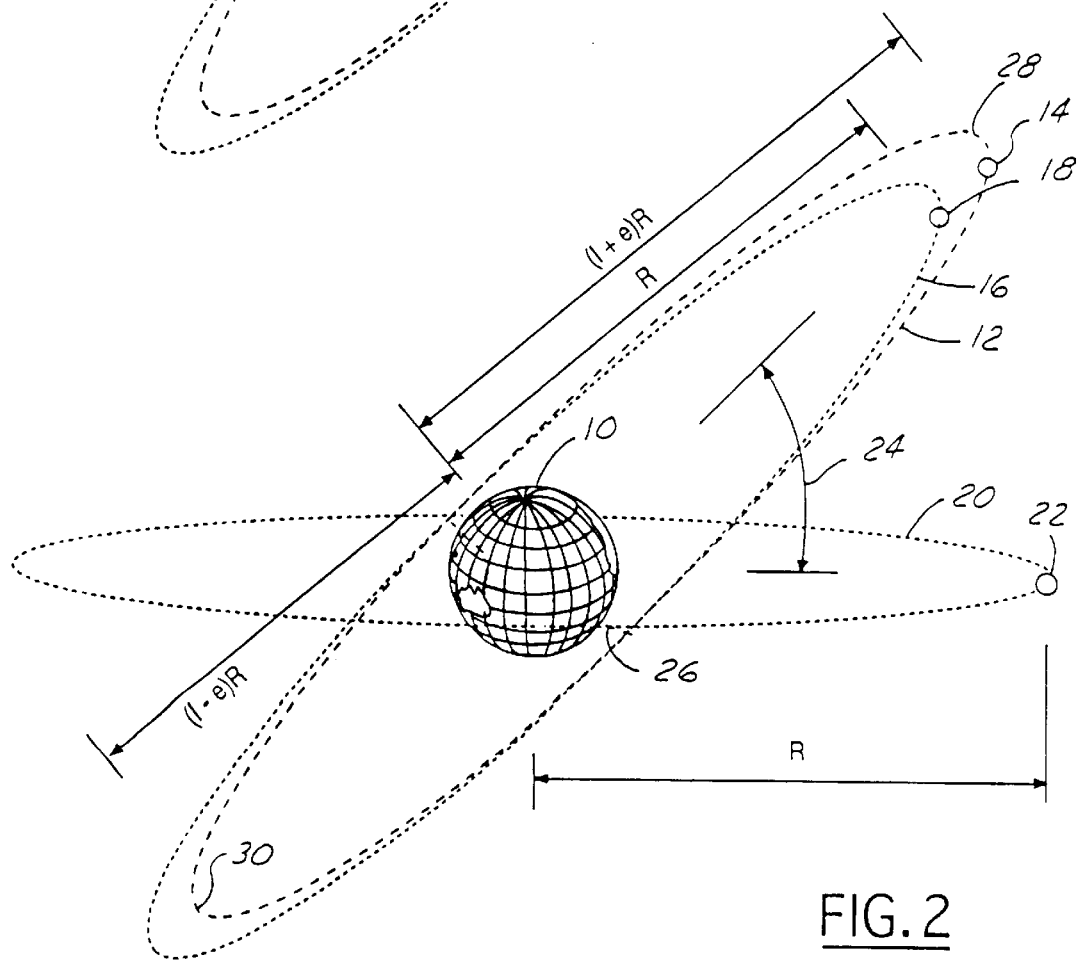
FIG. 2 is a perspective view similar to that of FIG. 1 five hours later in time.

FIGS. 1 and 2 illustrate some general differences between a GSO, an IGO and an IEGO orbit. In this example, GSO orbit 20 has a radius R. GSO orbit 20 is defined on the equatorial plane of Earth 10. As Earth 10 rotates daily, GSO satellite 22 maintains a substantially constant position over the Earth. As seen from a point on the Earth, the elevation angle of the satellite is constant.

IGO orbit 16 also has a radius R that is the same as that of GSO orbit 20. IGO orbit 16 is disposed on a plane that has an inclination angle 24 with respect to the equatorial plane having GSO orbit 20. The plane defined by IGO orbit 16 and GSO orbit 20 intersect at a line of nodes 26 that extends through the center of Earth 10. IGO satellite 18 and GSO satellite 22 take one sidereal day (23 hours, 56 minutes) to complete an orbit. The elevation angle of an IGO orbit with respect to a point on the Earth depends on the position of IGO satellite 18 in its IGO orbit 16.

IEGO orbit 12 has an apogee 28 being set at the northernmost point of the orbit when viewed with respect to the Earth and an perigee 30 being the southernmost point of the orbit when viewed with respect to the Earth. IEGO in elliptical orbit 12 has a focus that is shifted from that of IGO orbit 16 so that apogee 28 is shifted in the direction of the northern hemisphere. Consequently, perigee 30 is shifted toward the southern hemisphere. Thus, the altitude of apogee 28 above the surface of the Earth is increased while the elevation of the perigee 30 is decreased. The major diameter of IEGO orbit 12 is 2R as in the case of an IGO orbit 16. IEGO orbit 12 is, however, shifted with respect to the center of IGO orbit 16 by an eccentricity factor e. Thus, the distance of the apogee 28 from line of nodes 26 is given by the formula (1+e)R. The distance of perigee 30 from the line of nodes 26 is given by the formula (1−e)R.

A ground track 32 on the surface of Earth 10 may be developed from IEGO satellite 14. Ground tracks are imaginary lines representing the loci of subsatellite points that are repeatedly traced on the surface of the Earth by lines extending from the center of the Earth to orbiting satellites. IEGO ground tracks are located at specified longitudes and retrace repeatedly each sidereal day (23 hr. 56 min.).

The position of satellites 14, 18, 22 are shown about five hours later in FIG. 2 from that shown in FIG. 1. The Earth has thus rotated with respect to the orbits. Correspondingly, the elevation angle with respect to IGO satellite 18 and IEGO satellite 14 also changes.

Figure 3:
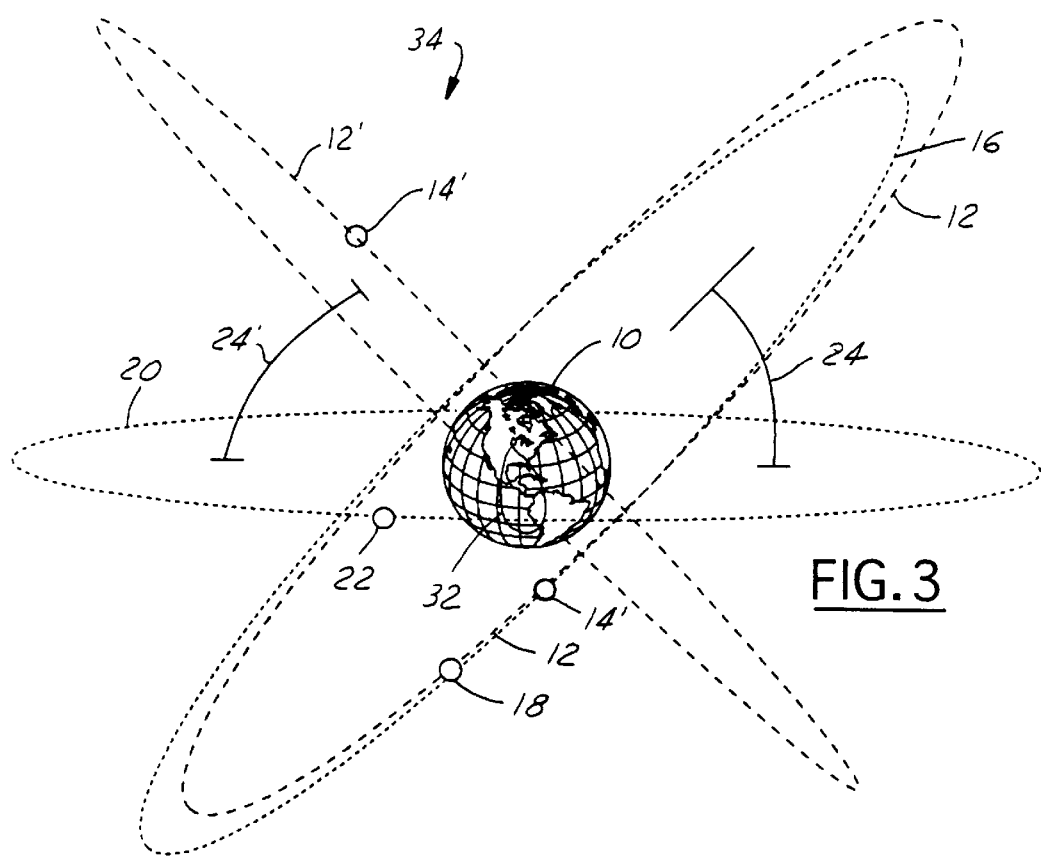
FIG. 3 is a perspective view of an alternative embodiment according to the present invention in which two IEGO orbit planes are established so that a phased pair of satellites will follow each other in a common ground or sky track.

Referring now to FIG. 3, a second IEGO orbit 12' is shown having an IEGO satellite 14'.

IEGO orbit 12' also has an inclination angle 24'. The inclination angle 24' and phasing are chosen so that the satellite placed in IEGO orbit 12' substantially traces the same ground track 32 as the satellite in IEGO orbit 12. The IEGO satellites 14, 14' are positioned so that as one satellite is leaving a service area, the other satellite is entering the service area. In this manner, continuous coverage may be provided to a particular service area.

Although not illustrated, the above example may be extended to three or more planes of IEGO orbits all synchronized so that continuous coverage may be provided to a service area within corresponding similar cones. More satellites may be required if a larger service area or a higher elevation angle within the service area is desired. By providing service at high elevation angles, applications in fixed satellite service, broadcast satellite service, or mobile satellite service may be more efficiently realized. Thus, a synchronized overhead IEGO system is generally indicated by reference numeral 34.

Figure 4:
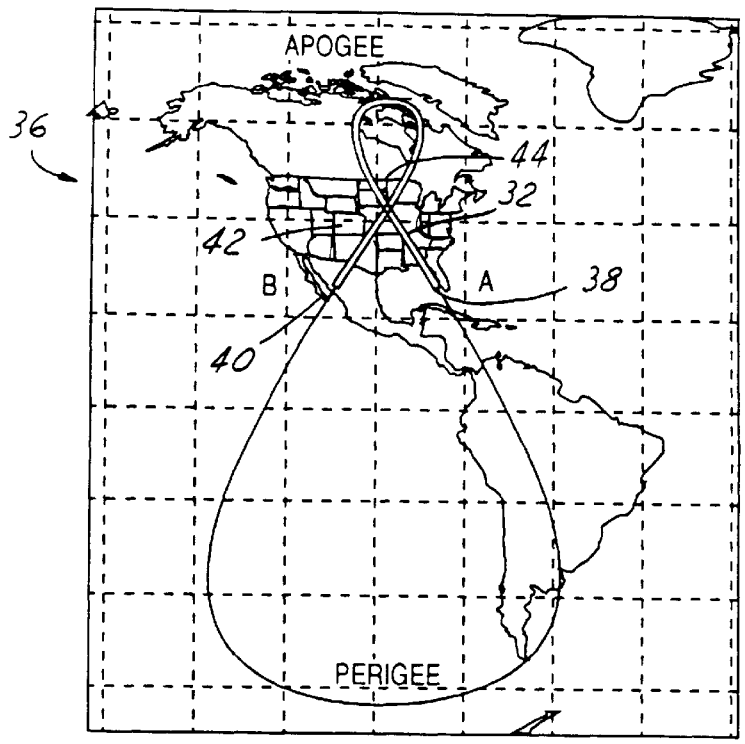
FIG. 4 is an equirectangular projection map showing a typical ground track associated with the present invention.

Referring now to FIG. 4, an equirectangular-projection map 36 shows North America and a substantial portion of South America. An example ground track 32 is shown that is projected from an IEGO orbit. The inclination of the ground track is 63.45° and has an eccentricity value e equal to 0.240 and is centered symmetrically on 96° west longitude (ascending at 69.0° west) and has an argument of perigee of 270°. Two similar satellites, A & B, are shown sharing ground track 32 and are separated by a half a period. Active satellite A is about to start operation as it rises through a eastern handover point 38 (latitude, longitude= 24.0N, 83.0W). Satellite B is concurrently setting through an western handover point 40 (latitude, longitude=24.0N, 109.0W). At the time when satellite A will set in the west, Earth stations 42 will again communicate with satellite B rising in the east. The distance between eastern handover point 38 and western handover point 40 is defined as the operating arc 44. The operating arc 44 is the portion of the ground track or a portion of the sky track (which remains in a cone overhead), when viewed from a point on the ground, over which the satellites operate.

Figure 5:
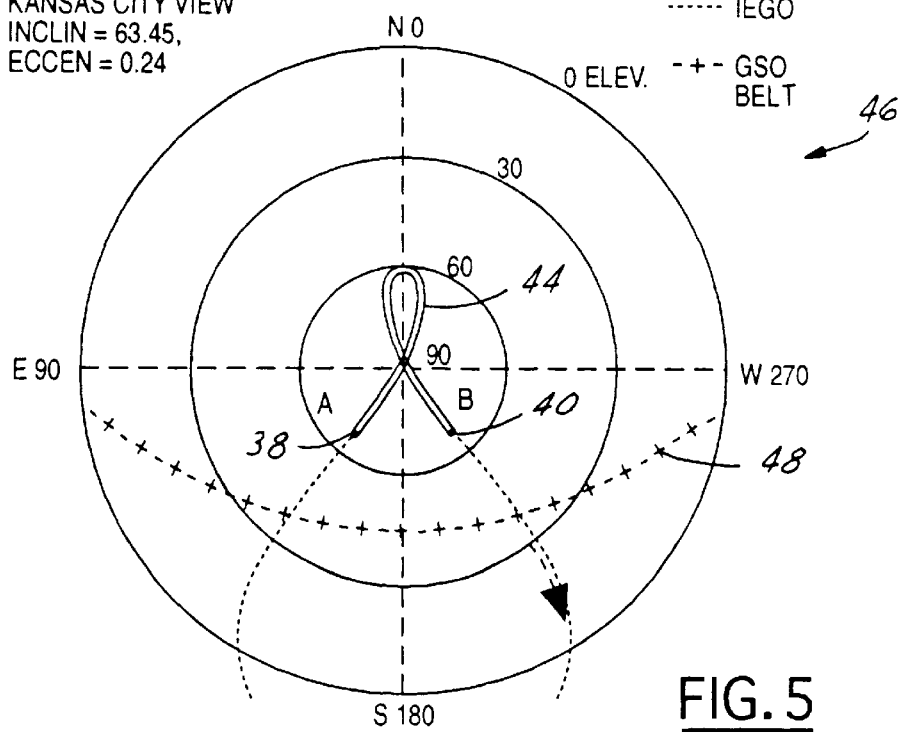
FIG. 5 is a upward looking view of an operating arc of the IEGO system of FIG. 4.

Referring now to FIG. 5, a skyward looking plot of the orbital path as seen from the center of the service area as shown in FIG. 4 is illustrated. On this plot, 0° represents the horizon while 90° represents the zenith over a particular point on the landmass. Handover points 38, 40 and operating arc 44 are also shown in skyward plot 46. A plot of the geostationary belt 48 is illustrated to contrast the inclined eccentric geosynchronous orbit.

Figure 6:
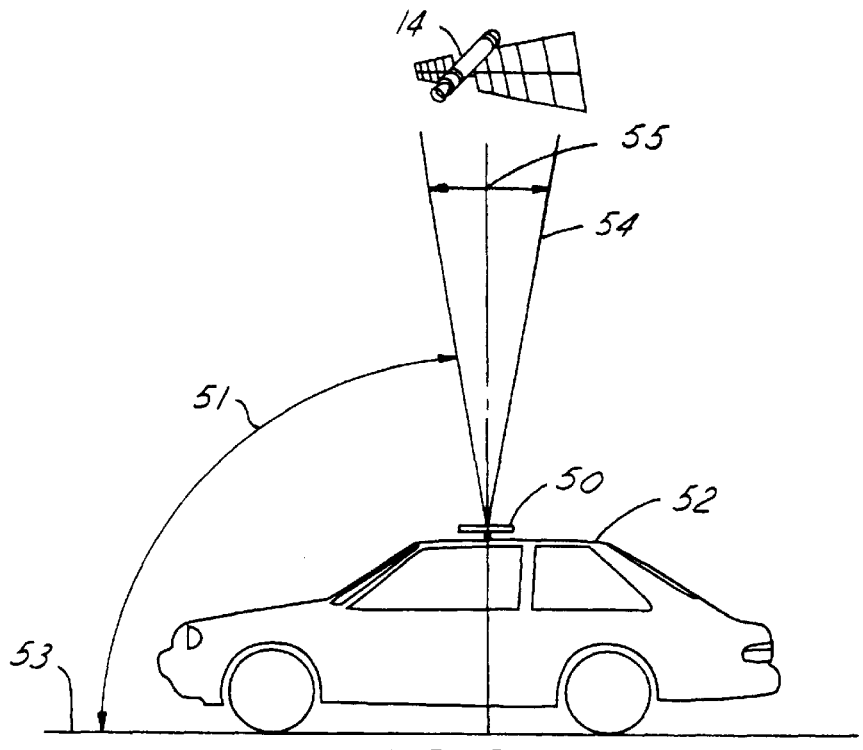
FIG. 6 is a perspective view of a upward receiving cone with respect to an antenna in one application of the invention.

Referring now to FIG. 6, a ground based user unit such as a mobile satellite receiving antenna 50 is positioned on an automobile 52. Thus, one advantage of the present invention is illustrated. That is, the present invention is suitable for mobile applications such as an automobile because a generally planar antenna 50 may be provided to receive signals from IEGO satellite 14 overhead. Cone 54 is directed in an upward direction toward the zenith. Because the elevation angle may be controlled, a relatively narrow cone 54 having a cone angle 55 may be generated by antenna 50 in an upward direction. This configuration provides higher gain than an omnidirectional antenna. The high elevation angles 51 from the horizon 53 of the system are more amenable to urban operation and being less affected by multi-path effects and atmospheric losses. No steering is required if an antenna providing an upward cone is provided that receives satellite signals throughout the service area.

Figure 7:
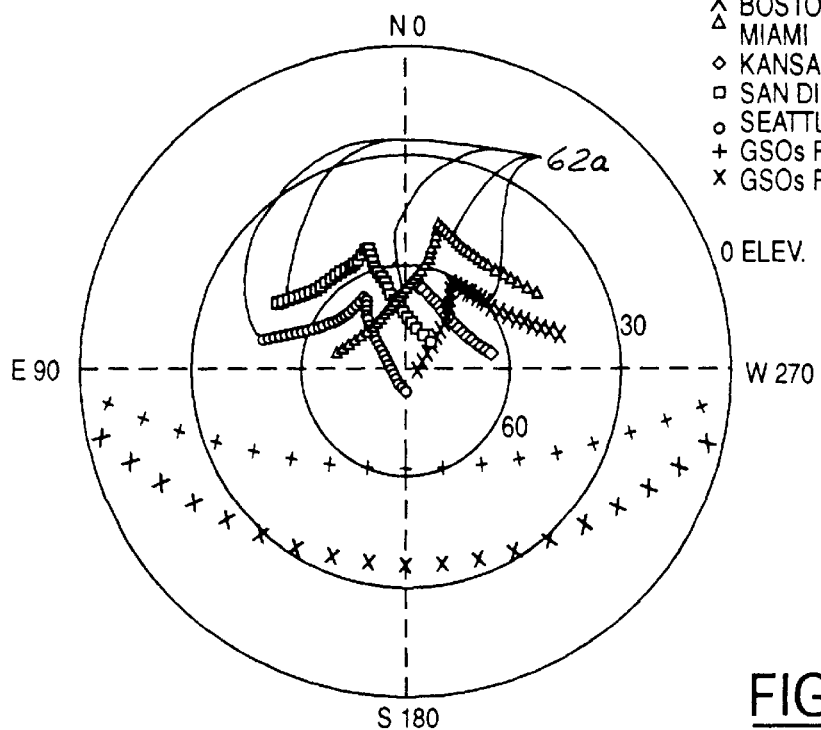
FIG. 7 is a skyward plot of a two IEGO system having an eccentricity of 0.463 from five locations in the continental U.S.

Referring now to FIG. 7, a skyward plot 58 is shown having an operating arc at about 45° or more in elevation angle above the horizon at (0°elevation angle) from each of five cities within the continental United States service area. The cities were chosen to provide a representative view from essentially four corners of the continental United States and the center of the United States. Also plotted is the geostationary belt as seen from Miami and Seattle. Orbital parameters have been chosen to extend to maximize the minimum elevation angle for plots 62*a* for all the cities within the service area. Plots 62*a* of FIG. 7 use two IEGO satellites with orbital eccentricity of 0.43 and an inclination angle of 63.45° resulting in a minimum elevation angle of 46.9. These plots are subsets of points on the operating arc portion 62 of the orbital track within the service area. Plots 62*a* are shown in contrast to GSO belts 63 as viewed from Miami and Seattle.

Figure 8:
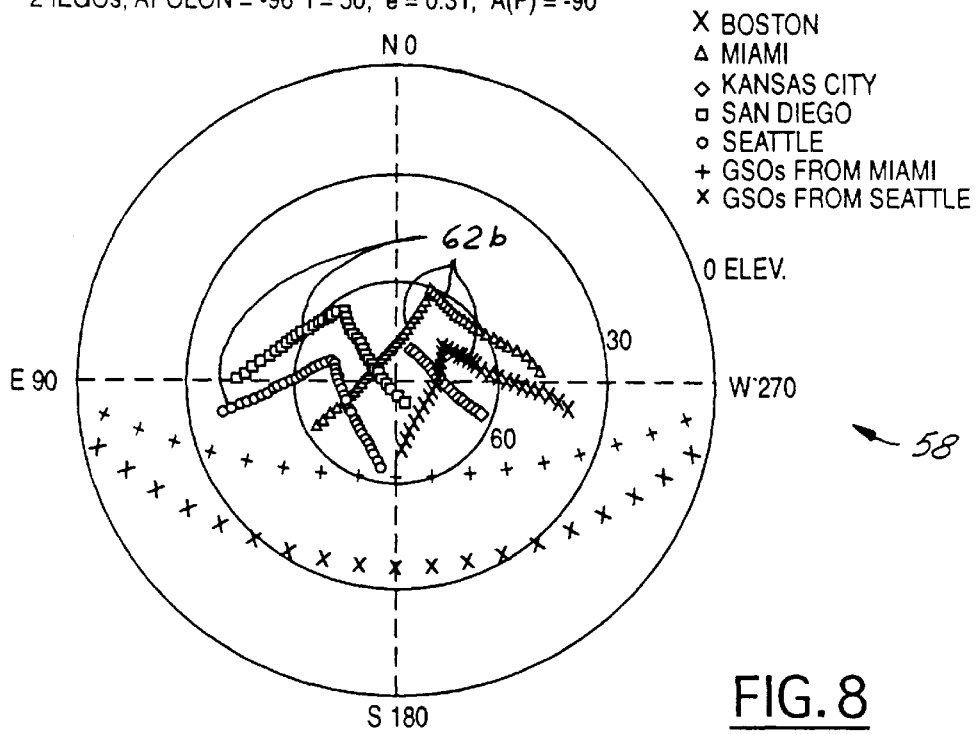
FIG. 8 is a variation of FIG. 7 having an eccentricity of 0.31.

Referring now to FIG. 8, plots 62*b* similar to that of FIG. 7 are shown having an eccentricity of 0.31, an inclination angle of 50° for a two-IEGO satellite system resulting in a minimum elevation angle of 39.1°.

Figure 9:
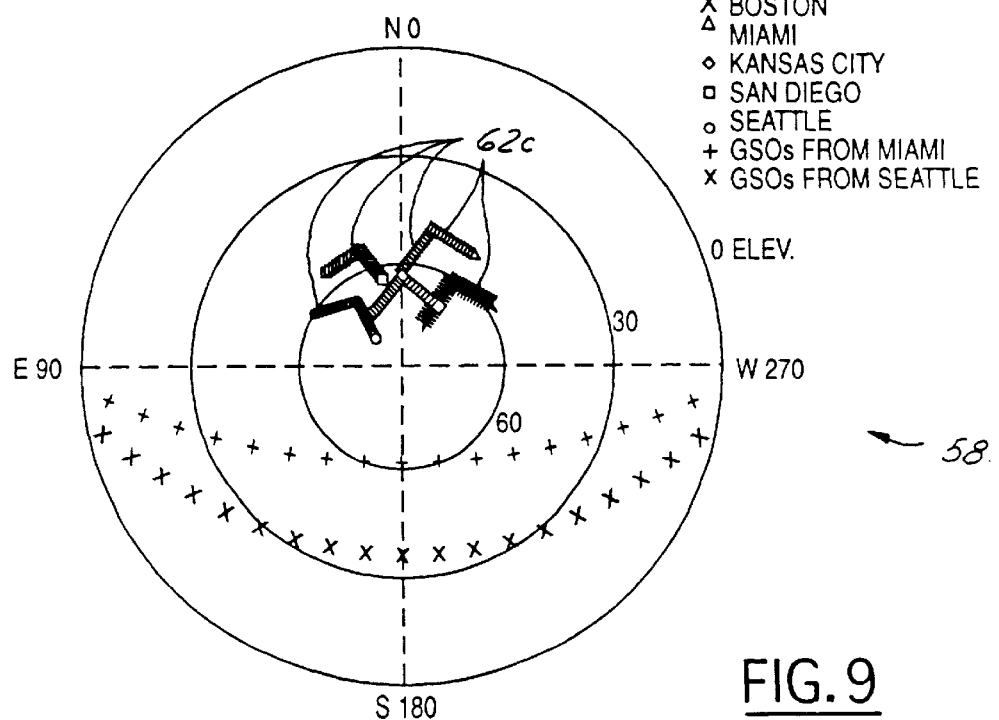
FIG. 9 is a skyward plot of a three IEGO system having an eccentricity of 0.505.

Referring now to FIG. 9, plots 62*c* having eccentricity of 0.505 and an inclination angle of 63.45° are illustrated for a three-IEGO satellite system resulting in a minimum elevation angle of 46.9°.

Figure 10:
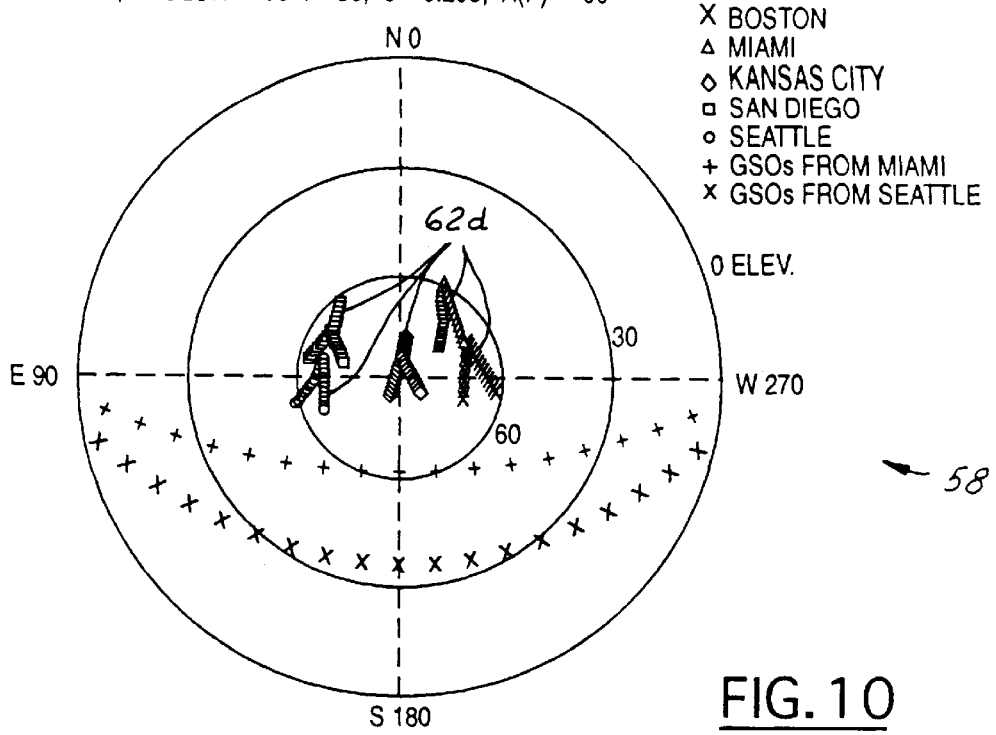
FIG. 10 is a skyward plot of a three IEGO system having an eccentricity of 0.203.

Referring now to FIG. 10, plots 62*d* having an eccentricity of 0.203 and an inclination angle of 50° are illustrated for a three-IEGO satellite system resulting in a minimum elevation angle of 59.2°.

Figure 11:
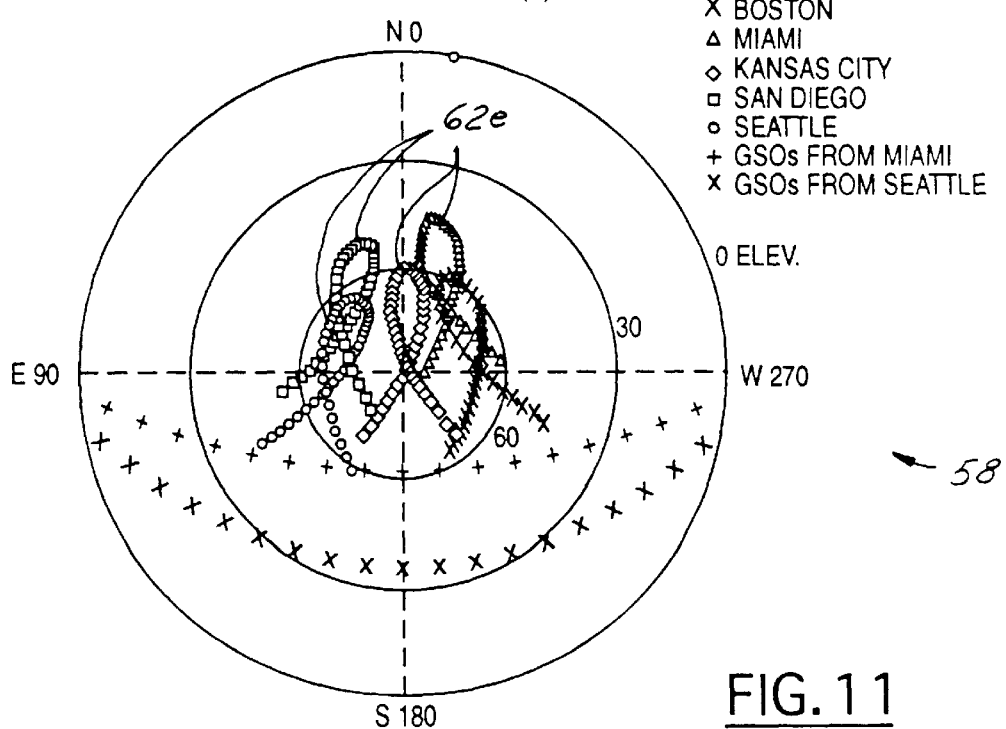
FIG. 11 is a skyward plot of a two IEGO system having an eccentricity of 0.24.

Referring now to FIG. 11, plots 62*e* having an inclination angle of 63.45° and an eccentricity of 0.24 are illustrated for a two-IEGO system resulting in a minimum elevation angle of 45.1°.

Thus, it can be observed that by changing the eccentricity values and the angle of inclination values, the shapes of the operating arc may be substantially changed to center the operating arc and maximize the minimum elevation angle within the service area.

Smaller eccentricity is preferred for the advantages of the more circular orbit, with small impact on the minimum elevation angle. In the case of the smaller service area such as a single state or city, the optimum eccentricity may differ from that of the larger service area. Thus, an optimum eccentricity may be between 0.1 and 0.5.

Figure 12:
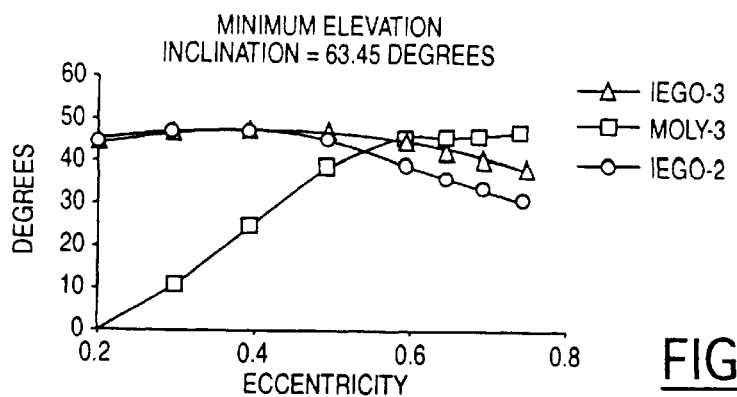
FIG. 12 is a plot of elevatnion angle in degrees versus eccentricity comparing an IEGO system and a Molniya system.

Referring now to FIG. 12, a plot of minimum elevation angle in degrees versus eccentricity for an inclination of 63.45° is shown resulting in a minimum elevation angle of 63.45°. Thus, the maximum of the minimum elevation angles occur as the eccentricity is about 0.3 to 0.5 for IEGOs at this inclination.

Figure 13:
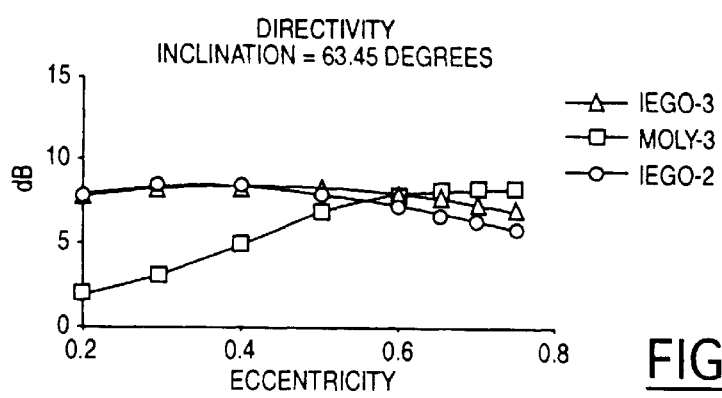
FIG. 13 is a directivity versus eccentricity plot comparing an IEGO system and a Molniya system.

Referring now to FIG. 13, the associated plot of geometric directivity of the receiving antenna versus eccentricity is plotted for a three IEGO system and a two IEGO system. As is shown, the directivity is maximized for eccentricity of about 0.3 to 0.5.

Figure 14:
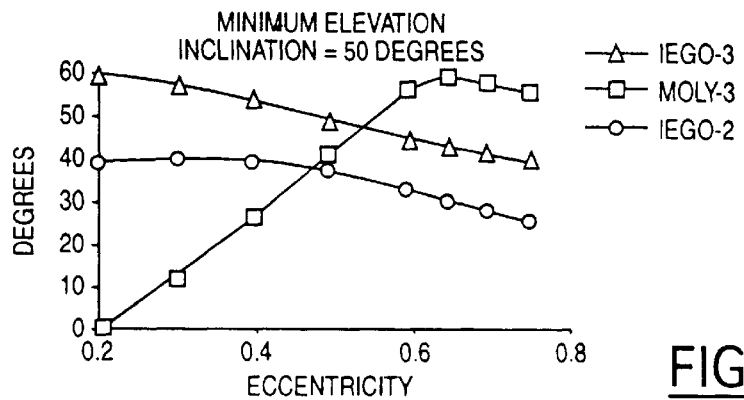
FIG. 14 is a plot of elevation angle in degrees versus eccentricity comparing an IEGO system and a Molniya system.

Referring now to FIG. 14, the minimum elevation angle versus eccentricity plot is shown for an inclination of 50°. In this case, near-maximum of the minimum elevation angle occurs for eccentricity of about 0.2.

Figure 15:
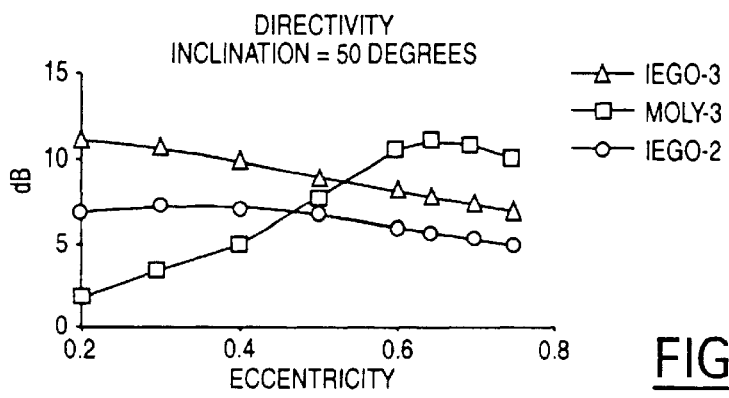
FIG. 15 is a directivity versus eccentricity plot comparing an IEGO system and a Molniya system.

Referring now to FIG. 15, a plot corresponding to that of FIG. 14 is shown for directivity in decibels versus eccentricity. The directivity is maximized for eccentricity of about 0.2 to 0.3 for two IEGO and three IEGO systems.

In FIGS. 12 through 15, the curve of minimum elevation angle for IEGO orbits is broad with maxima at low eccentricity. In contrast, such curves for HEOs including Molniyas rise with eccentricity, and peak at high eccentricity above 0.6. Consequently, the combination of elevation angles and number of satellites is more favorable for the more circular IEGO orbit of this invention than for HEO systems previously employed.

In operation, for a particular landmass, a service area must be defined on the surface of the Earth. A service area is defined as a region (such as the continental U.S. or smaller such as a city) which the satellite beams toward, with a predetermined minimum elevation angle above the horizon of any point in the service area. A satellite pair or a plurality of satellites sharing the same ground track are launched above the surface of the earth in an inclined eccentric geosynchronous orbit. The region of operation of each of the satellites within the orbit is the operating arc which is overhead on the Earth. Thus, as the satellites traverse their orbits, a loci of points is defined on the orbital track which define the service area and the operating arc above the service area. It is preferred that as one satellite is leaving the service area, a second satellite is entering the service area. Handover points are defined as the points where operation is changed from one satellite to another satellite. Thus, by defining the service area as a region having a relatively high elevation angle, better service coverage may be provided by a less expensive antenna not requiring adjustments by the user.

Orbital parameters are chosen to realize certain ground track shapes. Consideration is given to specified constraints on the service region, service area coverage, and coverage time.

While the invention has been described in detail, those familiar with the art to which this invention relates will recognize various alternative designs and embodiments for practicing the invention as defined by the following claims.

What is claimed is:

1. A satellite communications system comprising:
a service area on a surface of the earth having a predetermined minimum elevation angle from the horizon;
a ground station located within said service area;
a first satellite having a first eccentric, substantially 24-hour period geosynchronous orbit with respect to the earth having a first sky track when viewed from within said service area, said first orbit having first inclination relative to an equatorial plane of the earth;
a second satellite having a second eccentric, substantially 24-hour period geosynchronous orbit with respect to the earth having a second sky track when viewed from within said service area, said second orbit having a second inclination different from the first angle of inclination relative to an equatorial plane;
said first satellite having a first operating arc defined by a first subset of points on said sky track over said service area, said first satellite operating within the service area; and
said second satellite having a second operating arc defined by a second subset of points on the said second sky track within said service area, said second satellite operating within the service area.

2. A satellite communication system as recited in claim 1 wherein said first sky track and said second sky track are coincident.

3. A satellite communication system as recited in claim 1 wherein said first operating arc and said second operating arc having a respective first handover point and a second handover point for switching ground station operation between said first satellite and said second satellite.

4. A satellite communications system as recited in claim 1 wherein said first satellite and said second satellite are synchronized so that they are equally spaced in time.

5. A satellite communications system as recited in claim 1 wherein said first orbit and said second orbit have a predetermined eccentricity.

6. A satellite communications system as recited in claim 1 wherein said minimum elevation angle is greater than thirty degrees.

7. A satellite communications system as recited in claim 1 wherein said first ground station comprises a planar antenna.

8. A system as recited in claim 1 wherein said eccentricity factor between about 0.1 and 0.5.

9. A method of providing a system of satellite orbits, the method comprising:
specifying at least one geographic service area within which satellite coverage is to be provided, said service area having a minimum elevation angle thereabove;
defining a pair of inclined eccentric, substantially 24-hour period geosynchronous satellite orbits, each satellite orbit defining the orbit, each satellite orbit defining an orbital plane having a different angle of inclination with respect to the equatorial plane of the Earth, each orbit having a subset of points with sky track over the service area, each sky track having an operating arc corresponding to the region for which each of said pair of satellites operates.

10. A method as recited in claim 9 further comprising the steps of defining each orbital track to be coincident.

* * * * *

(12) EX PARTE REEXAMINATION CERTIFICATE (7859th)
United States Patent
Cellier

(10) Number: US 6,327,523 C1
(45) Certificate Issued: Nov. 9, 2010

(54) OVERHEAD SYSTEM OF INCLINED ECCENTRIC GEOSYNCHRONOUS ORBITTING SATELLITES

(75) Inventor: Alfred Cellier, Rancho Palos Verdes, CA (US)

(73) Assignee: Hughes Electronics Corporation, El Segundo, CA (US)

Reexamination Request:
No. 90/008,646, May 18, 2007

Reexamination Certificate for:
Patent No.: 6,327,523
Issued: Dec. 4, 2001
Appl. No.: 09/235,112
Filed: Jan. 21, 1999

(51) Int. Cl.
*G05D 1/00* (2006.01)
*G06F 7/00* (2006.01)
*G06G 7/78* (2006.01)

(52) U.S. Cl. ............................. 701/13; 701/3; 701/226; 224/158.4; 455/13.2; 455/430; 455/12.1; 342/356

(58) Field of Classification Search ................. 701/13, 701/226; 244/158.4; 455/12.1, 13.2, 430
See application file for complete search history.

(56) References Cited

U.S. PATENT DOCUMENTS

| 4,943,808 A | 7/1990 | Dulck et al. |
| 5,433,726 A | 7/1995 | Horstein et al. |
| 6,223,019 B1 | 4/2001 | Briskman et al. |

| 6,327,523 B2 | 12/2001 | Cellier |

FOREIGN PATENT DOCUMENTS

| EP | 0880240 | 11/1998 |
| EP | 0959573 | 11/1999 |
| JP | 1134996 | 5/1989 |
| JP | 5102920 | 4/1993 |
| JP | 05-300061 | 11/1993 |
| JP | 08-223100 | 8/1996 |

OTHER PUBLICATIONS

Maral, G.; Bousquet M.; "Satellite Communication Systems: Systems, Techniques & Technology"; John Wiley & Sons; Chichester, UK; XP002176175 ISBN: 0-471-93032-6; Second Edition; pp. 248-260.

Stuart, J. R. et al.; "Review of ESA Archimedes Study 1"; IEE Colloquium on Highly Elliptical Obit Satellite Systems; IEE; London, GB; May 24, 1989; pp. 2-1-2-4.

"Communication Satellite Engineering"; Lattice Press (transliterated); published Jun. 30, 1969; pp. 45-46.

Roddy, Dennis, Satellite Communications, (2nd ed.), copyright 1996, pp. 422-427, published by The McGraw-Hill Companies, Inc., U.S.A.

*Primary Examiner*—Matthew C. Graham

(57) ABSTRACT

A system of inclined geosynchronous satellite orbits has a service area defined on a surface of the earth. The service area has elevation angles greater than a predetermined minimum elevation angle elevation angle from the horizon. A satellite has an orbit with respect to the earth having a sky track when viewed from within said service area. An operating arc is defined by a subset of points on the sky track within the service area. The satellites operate consecutively on the operating arc.

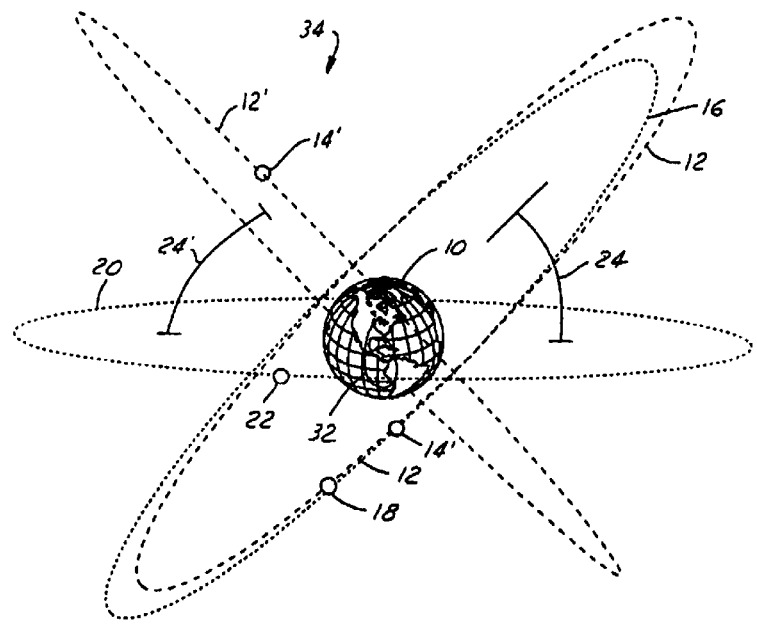

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 4-6 and 8-10 are cancelled.

Claims 3 and 7 are determined to be patentable as amended.

3. [A satellite communication system as recited in claim 1] *A satellite communications system comprising: a service area on a surface of the earth having a predetermined minimum elevation angle from the horizon; a ground station located within said service area; a first satellite having a first eccentric, substantially 24-hour period geosynchronous orbit with respect to the earth having a first skytrack when viewed from within said service area, said first orbit having first inclination relative to an equatorial plane of the earth; a second satellite having a second eccentric, substantially 24-hour period geosynchronous orbit with respect to the earth having a second skytrack when viewed from within said service area, said second orbit having a second inclination different from the first angle of inclination relative to an equatorial plane; said first satellite having a first operating arc defined by a first subset of points on said first skytrack over said service area; said first satellite operating within the service area; and said second satellite having a second operating arc defined by a second subset of points on said second skytrack within said service area, said second satellite operating within the service area;* wherein said first operating arc and said second operating arc having a respective first handover point and a second handover point for switching ground station operation between said first satellite and said second satellite.

7. [A satellite communications system as recited in claim 1] *A satellite communications system comprising: a service area on a surface of the earth having a predetermined minimum elevation angle from the horizon; a ground station located within said service area; a first satellite having a first eccentric, substantially 24-hour period geosynchronous orbit with respect to the earth having a first skytrack when viewed from within said service area, said first orbit having first inclination relative to an equatorial plane of the earth; a second satellite having a second eccentric, substantially 24-hour period geosynchronous orbit with respect to the earth having a second skytrack when viewed from within said service area, said second orbit having a second inclination different from the first angle of inclination relative to an equatorial plane; said first satellite having a first operating arc defined by a first subset of points on said first skytrack over said service area, said first satellite operating within the service area; and said second satellite having a second operating arc defined by a second subset of points on said second skytrack within said service area, said second satellite operating within the service area;* wherein said first ground station comprises a planar antenna.

* * * * *

(12) EX PARTE REEXAMINATION CERTIFICATE (9403rd)
United States Patent
Cellier

(10) Number: US 6,327,523 C2
(45) Certificate Issued: Nov. 9, 2012

(54) OVERHEAD SYSTEM OF INCLINED ECCENTRIC GEOSYNCHRONOUS ORBITTING SATELLITES

(75) Inventor: Alfred Cellier, Rancho Palos Verdes, CA (US)

(73) Assignee: Hughes Electronics Corporation, El Segundo, CA (US)

Reexamination Request:
No. 90/009,765, Jul. 26, 2010

Reexamination Certificate for:
Patent No.: 6,327,523
Issued: Dec. 4, 2001
Appl. No.: 09/235,112
Filed: Jan. 21, 1999

Reexamination Certificate C1 6,327,523 issued Nov. 9, 2010

(51) Int. Cl.
*G05D 1/00* (2006.01)
*G06F 7/00* (2006.01)
*G06G 7/78* (2006.01)

(52) U.S. Cl. ...... 701/13; 701/531; 244/158.4; 455/12.1; 455/13.2; 455/13.1

(58) Field of Classification Search .................. None
See application file for complete search history.

(56) References Cited

To view the complete listing of prior art documents cited during the proceeding for Reexamination Control Number 90/009,765, please refer to the USPTO's public Patent Application Information Retrieval (PAIR) system under the Display References tab.

*Primary Examiner* — Matthew C. Graham

(57) ABSTRACT

A system of inclined geosynchronous satellite orbits has a service area defined on a surface of the earth. The service area has elevation angles greater than a predetermined minimum elevation angle elevation angle from the horizon. A satellite has an orbit with respect to the earth having a sky track when viewed from within said service area. An operating arc is defined by a subset of points on the sky track within the service area. The satellites operate consecutively on the operating arc.

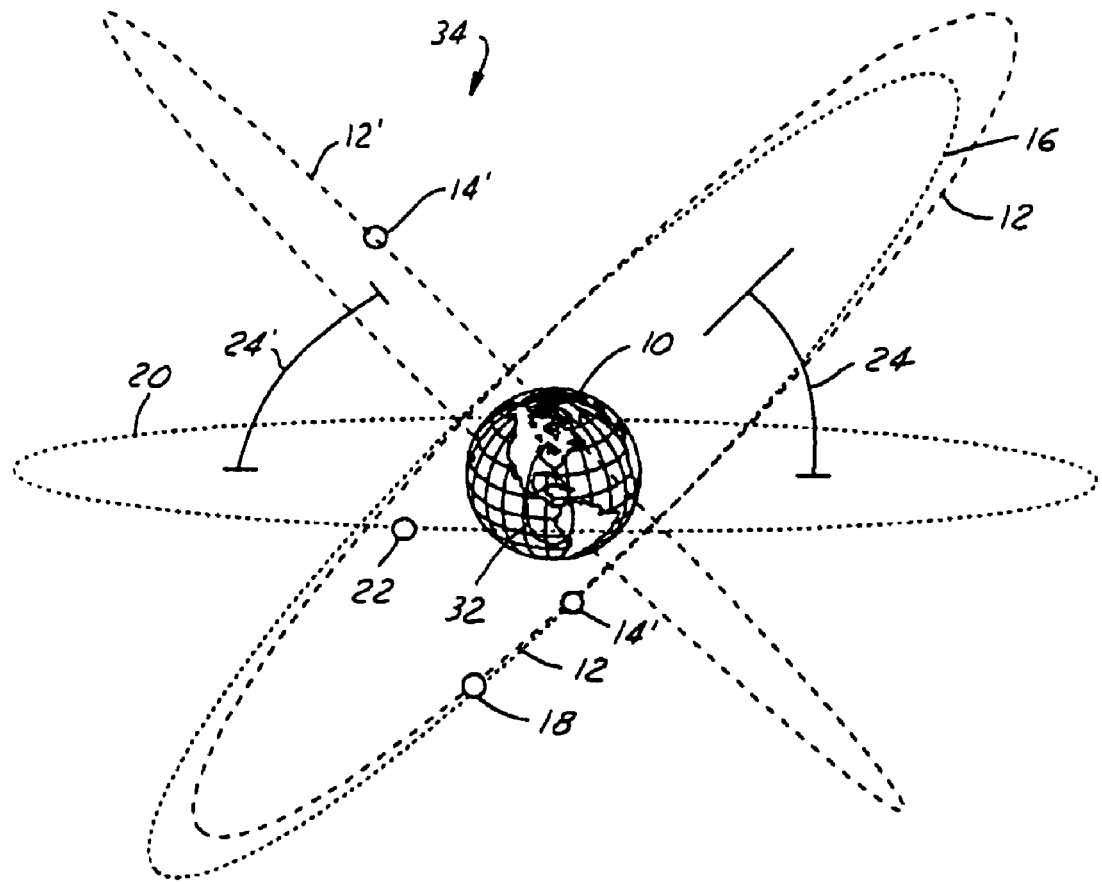

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1, 2, 4-6 and 8-10 were previously cancelled.

Claims 3 and 7 are cancelled.

\* \* \* \* \*